(12) United States Patent
Rega Villar et al.

(10) Patent No.: US 11,090,748 B2
(45) Date of Patent: Aug. 17, 2021

(54) DEVICE ADAPTED TO DOSING PASTY SUBSTANCES

(71) Applicants: UNIMATE ROBOTICA, S.L., Pontevedra (ES); AUTOMATISMOS RODAIRA, S.L., Pontevedra (ES); VELOX SOLUTIO, S.L., Vigo (ES)

(72) Inventors: Delfin Rega Villar, Pontevedra (ES); Jose Luis Rodriguez Diaz, Pontevedra (ES); Jose Julio Aira Garcia, Pontevedra (ES); Sergio Steinbruggen Cayo, Pontevedra (ES); Castor Gonzalez Vazquez, Pontevedra (ES)

(73) Assignees: UNIMATE ROBOTICA, S.L., Pontevedra (ES); AUTOMATISMOS RODAIRA, S.L., Pontevedra (ES); VELOX SOLUTIO, S.L., Vigo (ES)

( * ) Notice: Subject to any disclaimer, the term of this patent is extended or adjusted under 35 U.S.C. 154(b) by 0 days.

(21) Appl. No.: 16/332,127

(22) PCT Filed: Sep. 12, 2017

(86) PCT No.: PCT/EP2017/072816
§ 371 (c)(1),
(2) Date: Mar. 11, 2019

(87) PCT Pub. No.: WO2018/050614
PCT Pub. Date: Mar. 22, 2018

(65) Prior Publication Data
US 2019/0366458 A1    Dec. 5, 2019

(30) Foreign Application Priority Data
Sep. 13, 2016 (EP) ..................... 16382421

(51) Int. Cl.
*B23K 1/00* (2006.01)
*B23K 3/06* (2006.01)
(Continued)

(52) U.S. Cl.
CPC .......... *B23K 1/0006* (2013.01); *B23K 3/0638* (2013.01); *F04B 13/00* (2013.01);
(Continued)

(58) Field of Classification Search
CPC .. F04B 43/0072; F04B 43/1223; F04B 43/12; F04B 43/08
See application file for complete search history.

(56) References Cited

U.S. PATENT DOCUMENTS 2,015,123 A    9/1935  Pennell
6,270,326 B1   8/2001  Kuriyama et al.
(Continued)

FOREIGN PATENT DOCUMENTS

GB    2174763 A       11/1986
JP    2007120355 A  * 5/2007
(Continued)

OTHER PUBLICATIONS

International Search Report and Written Opinion for Corresponding International Application No. PCT/EP2017/072816 (9 Pages) (dated Dec. 13, 2017).
(Continued)

*Primary Examiner* — Donnell A Long
(74) *Attorney, Agent, or Firm* — Lucas & Mercanti, LLP (57) ABSTRACT

A device for applying fluid having a pasty consistency is provided. The present invention relates to a device for applying brazing paste manually or by means of a robotic arm, having an elastically deformable conduit and a drive spindle.

11 Claims, 7 Drawing Sheets

(51) Int. Cl.
    *F04B 13/00*     (2006.01)
    *F04B 15/02*     (2006.01)
    *F04B 43/00*     (2006.01)
    *F04B 43/12*     (2006.01)

(52) U.S. Cl.
    CPC .......... *F04B 15/02* (2013.01); *F04B 43/0072* (2013.01); *F04B 43/1223* (2013.01)

(56) References Cited

U.S. PATENT DOCUMENTS

| | | |
|---|---|---|
| 2016/0031029 A1 | 2/2016 | Martensson |
| 2017/0028126 A1* | 2/2017 | Moosai .................. F16B 45/00 |
| 2017/0074257 A1* | 3/2017 | Chini .................. F04B 23/025 |

FOREIGN PATENT DOCUMENTS

| | | | |
|---|---|---|---|
| JP | 2007120355 A | 5/2007 | |
| JP | 2015529397 A | 10/2015 | |

OTHER PUBLICATIONS

International Preliminary Report on Patentability for Corresponding International Application No. PCT/EP2017/072816 (16 Pages) (dated Dec. 19, 2018).

\* cited by examiner

DEVICE ADAPTED TO DOSING PASTY SUBSTANCES

CROSS REFERENCE TO RELATED APPLICATION

This Application is a 371 of PCT/EP2017/072816 filed on Sep. 12, 2017 which, in turn, claimed the priority of European Patent Application No. 16382421.2 filed on Sep. 13, 2016, both applications are incorporated herein by reference.

OBJECT OF THE INVENTION

The present invention relates to a device adapted to dosing fluid having a pasty consistency. Particularly, the present invention relates to a device for applying brazing paste manually or by means of a robotic arm, comprising an elastically deformable conduit and a drive spindle.

BACKGROUND OF THE INVENTION

In the joining process known as brazing, the filler material for performing it, generally a metal powder with a melting point below the melting temperature of the part to be joined, can be applied on or close to the joint that is to be welded together with binders, fluxes and/or other additives, such that they form a fluid having a pasty consistency. This fluid, which must be a homogeneous mixture so that the application thereof is effective, usually has a high viscosity and, since the powder is abrasive, specific tools with abrasion-resistant materials are required.

This joining process is widespread in the industry, particularly in the automotive sector, as a result of the possibility of being automated and the capacity thereof to join a plurality of parts with a single passage through the furnace, so the adaptation thereof to mass production equipment is advantageous.

Patent document JP 2015529397 A describes a solder paste supply device comprising two cylindrical chambers with pistons and a bottle-neck connection part communicating both chambers further comprising a nozzle for applying the solder paste. This device requires both pistons to move in one direction or another for depositing the fluid, and said pistons must furthermore be reloaded every time their load runs out.

Patent document US 2016031029 A1 describes a device and a method for jetting particles of viscous material on a workpiece. To achieve this effect, the device has a feed screw moving the fluid along a feed conduit to a plunger jetting the material through the nozzle. This mode not only requires rotational movement of the feed screw but also alternative movement of the plunger. Furthermore, this device only allows applying the viscous material discontinuously as a result of the movement of the plunger.

In any of these inventions of the state of the art, those moving portions with sliding surfaces which are in contact with the paste are subjected to abrasion by the metallic powder.

None of the preceding devices can duly solve all the existing problems. Particularly, none of them allows applying a high viscosity abrasive substance, such as the case of brazing paste, continuously or at intervals by means of a versatile tool that can be handled by an operator or adapted to the arm of an industrial robot such that it can efficiently dose abrasive pastes in automated processes.

DESCRIPTION OF THE INVENTION

The present invention provides an alternative solution to the aforementioned problems which can be overcome by means of a device for dispensing a high viscosity fluid abrasive substance comprising the combination of a drive spindle and an elastically deformable conduit for feeding the fluid.

In a first inventive aspect, the invention provides a device adapted to dosing fluids having a pasty consistency, comprising:
a first base with an inlet for the fluid;
a second base, spaced from the first base, with an outlet for the fluid;
an elastically deformable tubular conduit with an end in fluid communication with the inlet and with the opposite end in fluid communication with the outlet;
a rotating spindle with at least one spiral thread for driving the fluid housed in the tubular conduit, with an end of the spindle rotationally attached to the first base and the opposite end of the spindle rotationally attached to the second base, this spindle being adapted for pressing on the tubular conduit with at least one part of its spiral thread;
a support backing of the tubular conduit such that at least the segment of tubular conduit adapted for being in contact with the spindle is located between the spindle and the support backing;
an actuating shaft integrally attached to the spindle for driving the rotation of said spindle.

Throughout the present document, "fluid having a pasty consistency", "fluid" or "paste" will be understood as any fluid material having a viscosity that is possibly higher than that of water in environmental conditions, being particularly valid for gels, amalgams or fluids with a comparable viscosity. Notwithstanding what has been indicated above, the device will also be able to dispense fluid of other types, regardless of the physical properties thereof.

The term "elastically deformable tubular conduit" generally describes any element which allows fluid communication between two points separated from one another, with elastic capacities allowing it to change shape, for example, restricting or even completely closing the opening of its inner cavity by applying pressure on its outer walls without negatively affecting the integrity of the element.

It is understood that the "spindle" is an essentially cylindrical element on the side of which there is one or more elements, which will be referred to as threads, projecting from the level defined by the radius of the cylinder, the function of the spindle being to rotate along the length of its longitudinal axis.

The element referred to as "support backing" must be interpreted in this description as the element that serves as a support and is adapted for receiving a force by means of the support. Particularly, the tubular conduit is located between the support backing and the spindle such that the force applied by the spindle on the tubular conduit is supported by the support backing located on the other side of the tubular conduit. Furthermore, it can perform additional functions, such as serving as a mount for the conduit or closing the cavity of the spindle.

In a particular embodiment, the support backing comprises a partial housing for the tubular conduit to allow the support of the tubular conduit on said support backing and to allow the contact of the spiral thread with the tubular conduit such that the partial housing secures the position of the tubular conduit upon receiving deformation strain from the spindle.

Advantageously, the support backing allows positioning the tubular conduit in relation to the bases of the device and to the spindle, fixing the ends of the assembly and making the contact between the threads of the spindle and the walls of the tubular conduit possible.

In a particular embodiment, the tubular conduit and the support backing are integrated in one and the same part.

In a particular embodiment, the tubular conduit and the support backing are independent parts.

Advantageously, the tubular conduit is configured for being able to be easily taken out, as an independent part or together with the support backing.

In a particular embodiment, the support backing is made of an elastically deformable material. As a result of this feature, the support backing can absorb the stress produced by the pressure of the threads on the tubular conduit and distribute it throughout the structural elements of the device in contact with the support backing. In this embodiment, the support backing is more rigid that the tubular conduit, for example, by means of a thicker wall.

In another particular embodiment, the dosing device comprises a shell attached to the first base and to the second base.

Advantageously, the shell constitutes a protective structural element which allows keeping the elements forming it together, distributing stress and preventing the presence of foreign bodies. The shell, in addition to being part of the structural assembly formed by both bases, can perform additional functions such as the function of containing a lubricating fluid to reduce the friction between the spindle and the elastically deformable conduit as a result the sliding of the threads forcing the fluid having a pasty consistency to move forward.

In a particular embodiment, the first base, the second base, or both, are integral part of the shell enclosing the space housing at least the spindle and the tubular conduit. It is therefore possible to streamline the manufacture and the use of the device, reducing the number of different elements forming it.

In another particular embodiment, the shell comprises one or more screws transversely threaded to said shell, with the head accessible from the outside, the end of which reaches the support backing to act as a temporary support for the adjustable spindle.

The position of the support backing or the tubular conduit with respect to the spindle can advantageously be adjusted, or the degree of restriction of the tubular conduit can advantageously be regulated to control the fluid flow rate, by regulating the position of the transverse screws which are in contact with the support backing or directly in contact with the tubular conduit such that they act as a support of the support backing or of the tubular conduit.

In yet another particular embodiment, a plate interposed for homogenizing the force of the screws on the support backing is arranged between the threaded screws and the support backing.

Advantageously, the plate is a rigid element which allows distributing the stress applied by the screws along the length of the tubular conduit.

In a preferred embodiment, the shaft is flexible, connecting an actuator motor and the spindle to allow for the manual orientation of said device.

The use of a flexible shaft is particularly advantageous as it allows transmission of torque to the spindle regardless of the position of the device in relation to the source of the torque. The shaft can therefore be used manually by an operator a certain distance from the source of the torque.

In another particular embodiment, the shaft is rigid, connecting an actuator motor and the spindle to allow for the mounting of said device on a machine. Advantageously, the rigid shaft-operated device can be mounted on a mount of a machine tool or a robotic arm.

In another particular embodiment, the spindle has a discontinuous spiral thread for driving the fluid discontinuously.

The mentioned discontinuities of the spindle, which can be, for example, notches or sections eliminated from the thread arranged in spiral around the spindle, allow the fluid to flow at regular intervals, which may be applicable in automated production processes.

In a particular embodiment, the spindle has a spiral thread with a curved section. Advantageously, the mentioned spiral thread of the spindle allows transforming the torque of rotation of the spindle into a force normal to the flank of the thread. Depending on the profile of the thread, it applies on the tubular conduit a force which, according to its direction can be broken down into two components, a radial component and a longitudinal component, the longitudinal component being responsible for moving the fluid. A thread with a curved section allows contact with the conduit to take place gradually, obtaining as a result a smooth fluid movement. The smooth shape of a curved section also increases the service life of the elastically deformable conduit deformed by said thread.

In another embodiment, the invention provides a system for dosing fluids having a pasty consistency, comprising a device according to any of the preceding embodiments and a drive motor for driving the shaft which can be regulated by the user.

In the present document, the drive motor for driving the shaft is interpreted as any source of drive torque capable of transmitting power to the shaft of the spindle, the power level and/or rotational speed thereof preferably being able to be regulated, such as an electric motor, for example.

In a preferred embodiment, the system comprises a fluid drive unit for increasing the pressure of said fluid at the inlet.

Advantageously, the fluid drive unit allows maintaining a fluid pressure level which makes it easier for the fluid to enter the device by making the passage of the fluid through the device easier, even for high viscosity fluids. Nevertheless, the drive unit does not establish the flow rate of the paste to be supplied, rather the assembly formed by the spindle and the elastically deformable conduit is what determines the flow rate of the paste, particularly by means of the rotational speed of the spindle and the spiral thread pitch of the spindle.

In another particular embodiment, the fluid outlet comprises an interchangeable applicator. Advantageously, the applicator allows depositing the fluid on a particular point of the surface of a part, the dimensions of the section of the applicator determining at the end thereof the amount and shape of the deposited material. In a simple example, this applicator can be a simple cylindrical, straight or conical conduit.

In a last particular embodiment, the device comprises a mechanical, electromagnetic or pneumatic clamp to keep the support backing attached to the shell.

DESCRIPTION OF THE DRAWINGS

The foregoing and other features and advantages of the invention will be more clearly understood based on the following detailed description of a preferred embodiment, provided only by way of an illustrative and non-limiting example in reference to the attached drawings.

DETAILED DESCRIPTION OF THE INVENTION

According to the first inventive aspect, the present invention relates to a device for dosing or applying fluids having a pasty consistency, particularly for applying brazing paste on the contact surface between two parts to be welded together. In addition to being abrasive, this material usually has a high density and viscosity. For this reason, it is not possible to use conventional devices for applying welding material in the form of gels or pastes or these devices will have a short service life as a result of wear. As an additional advantage, the device is also capable of dispensing other fluids, regardless of their density or viscosity.

Figure 1A:
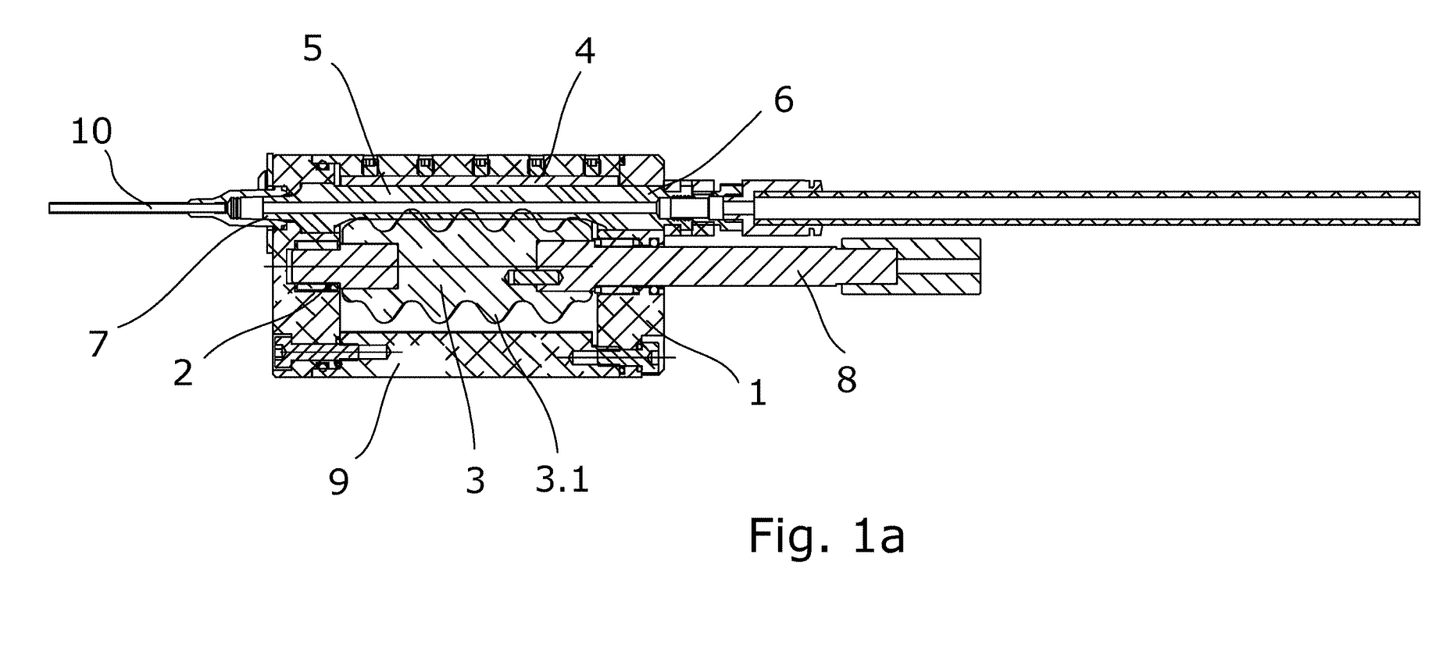
FIGS. 1a-1b show a first embodiment of the device, including a section view.
Figure 1B:
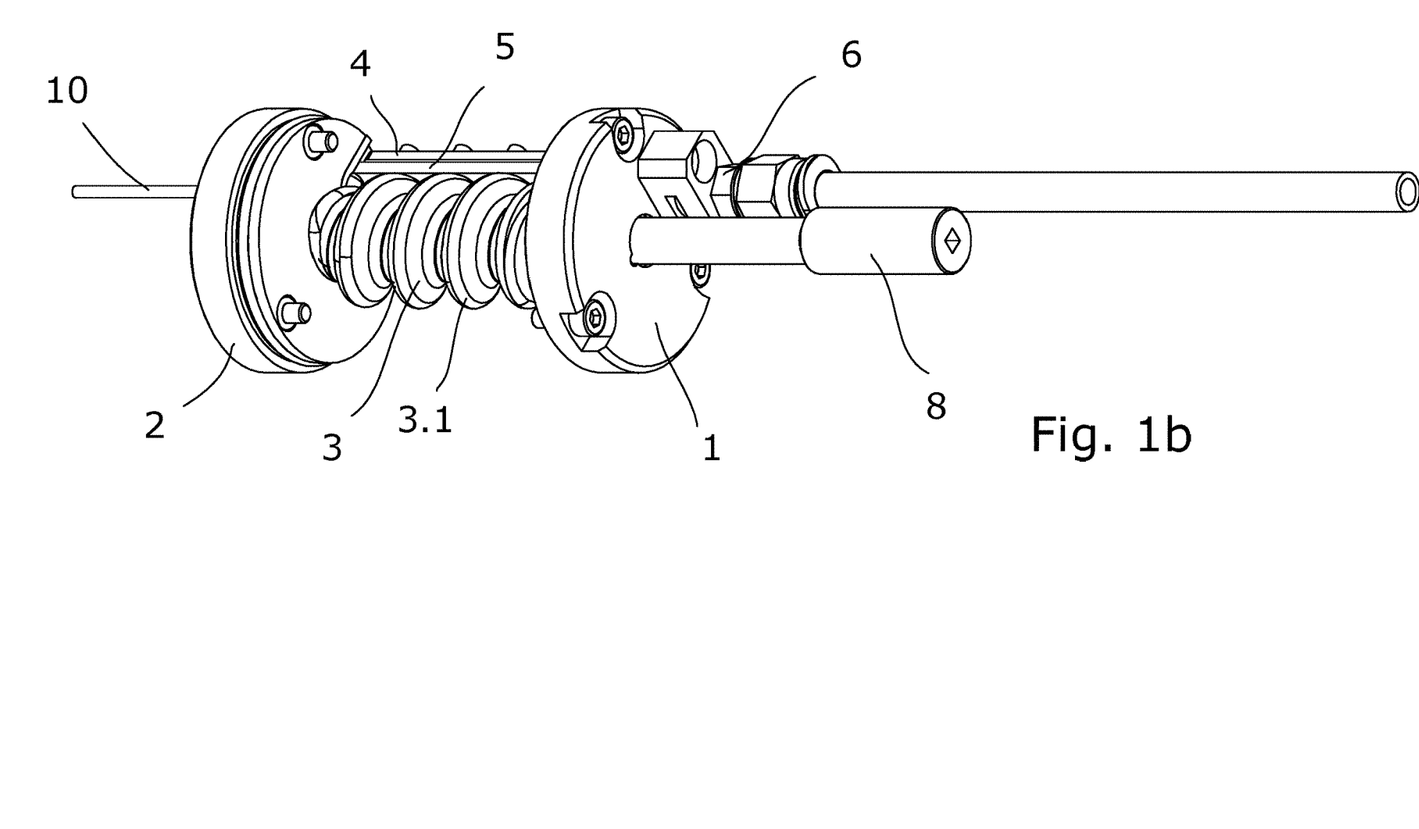

In a first preferred embodiment of the present invention shown in FIGS. 1a and 1b, the device comprises an elastically deformable cylindrical tubular conduit (5) through which the brazing paste flows, and a spindle (3) driven by a spiral drive shaft (8) arranged parallel to the tubular conduit (5) and interfering it, such that the threads (3.1) of the spindle (3) press on the tubular conduit (5) obstructing it partially or completely, and such that when the spindle (3) rotates, the spiral threads (3.1) push the pressed conduit segment in the axial direction, causing the movement of the paste contained inside the tubular conduit (5).

A stator, mount or support backing (4) holds the tubular conduit (5) to prevent it from moving and serves as a support against the pressure and stress applied by the threads (3.1) of the spindle (3). As can be seen in FIG. 1a, in this embodiment the support backing (4) is in turn supported on a shell (9), a structural element containing and protecting the components of the device, serves as a support for the components and allows an operator to hold the device with their hand or another type of mount. The ends of the shell (9) are closed by two bases, the first base (1) and the second base (2), having in this embodiment the additional function of fixing the tubular conduit (5) at both ends, allowing the entry and exit of the paste through the inlet (6) and the outlet (7), allowing the connection of the drive shaft (8) acting on the spindle (3), serving as a rotary support for the spindle (3) through a bearing, and holding an applicator (10) or nozzle. The bases (1, 2) are attached to the shell (3) by means of screws, and they can be removed to access the inside of the device, for example, for repairing or for replacing the tubular conduit (5). Additionally, the empty space formed between the shell (9) and the other elements of the device can be filled with a lubricating element, for example, glycerin, to reduce the friction between the spindle (3) and the tubular conduit (5).

There is supported on the portion of the support backing (4) arranged on the side opposite the spindle (3) a flat plate or sheet interposed between the support backing (4) and a series of screws arranged in the radial direction with respect to the shaft of the spindle (3). Its function is to regulate the position of the flat plate which presses on the support backing (4) and allows regulating the position of the tubular conduit (5) with respect to the spindle (3) and the degree of restriction of the conduit (5).

The first base (1) has an inlet (6) for the paste in fluid communication with the tubular conduit (5); this inlet (6) comprises an anchoring element for holding the tubular conduit (5) on the inner face of the first base (1), and a connection point with the paste feed conduit on its outer face. This connection must be suitable for supporting pressures higher than the environmental pressure and withstanding tensile strain, bending strain, etc. produced by the use of the device in different positions. At another point of the first base (1), an opening allows the access of an actuator or a flexible drive shaft (8) to transmit torque to the shaft of the spindle (3), this attachment being able to be a mechanical-type attachment by means of a shaft with a key, by means of a magnetic coupling or through a gear train, for example.

Like in the first base (1), the ends of the shaft of the spindle are supported on the second base (2), such that they can rotate freely by means of bearings. The second base (2) comprises an outlet (7) in fluid communication with the tubular conduit (5), configured for coupling an applicator (10), and an anchoring for the front end of the tubular conduit (5). The main function of the applicator (10) is to project the paste flow onto a part, with the desired shape and size. Said applicator (10) can be a long and narrow conduit with an end that can be connected to the second base (2) by screwing or snap-fitting. An additional function of the applicator (10) and of the front end of the tubular conduit (5) is to form an intermediate storage volume to produce a continuous paste flow rate at the outlet of the applicator (10).

The material of the tubular conduit (5) is preferably an elastically deformable material that is resistant to abrasion and repetitive shearing strains, such as silicone, polyurethane or a similar material, for example. Not reacting chemically with the paste, being lightweight, cost-effective and easy-to-manufacture are other desirable features of the material.

The cross section of the tubular conduit (5) must be such that it allows the paste to flow through the inside thereof and has a high resistant to shearing strains applied by the spindle (3) in the radial direction with respect to the spindle (3) and to tensile strain in the axial direction. Furthermore, it must make the fixing thereof to the support backing (4) or the shell (9) easier. A possible section of the tubular conduit (5) according to a transverse plane is essentially circular, hollow, with a thicker wall in the portion that fits in the support backing (4), and a thinner wall in the portion in contact with the spindle (3).

The spindle (3) must be made with a dimensionally stable resistant material that is harder than the tubular conduit (5) and with a reduced level of friction. One possibility is to make said spindle with polished metal, steel or lightweight aluminum alloys, composite materials or plastic materials can also be used, for example. Additionally, one desirable feature is for the spindle to be lightweight so that it can be comfortably handled by an operator, or so that it can be coupled to a robotic arm without creating high inertias.

Figure 2A:
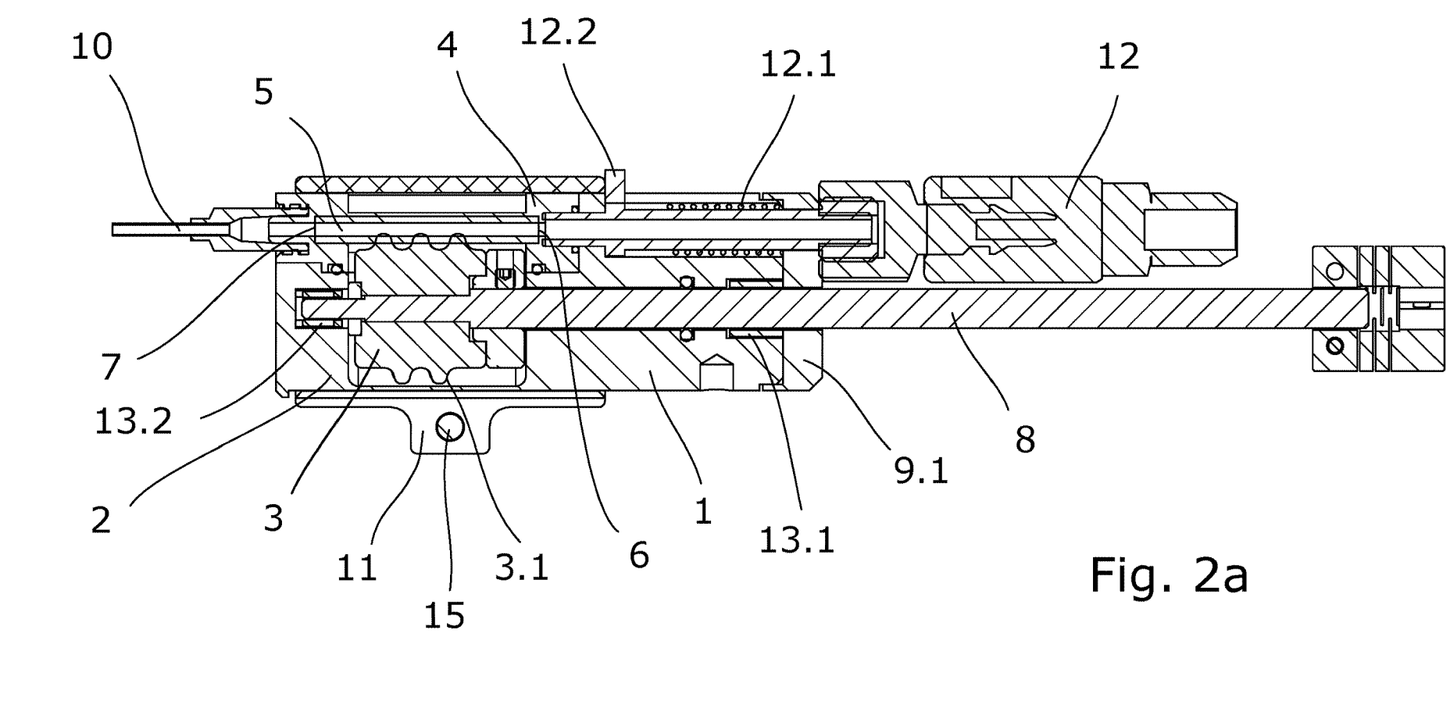
FIGS. 2a-2c show a second embodiment of the device, including two section views.
Figure 2B:
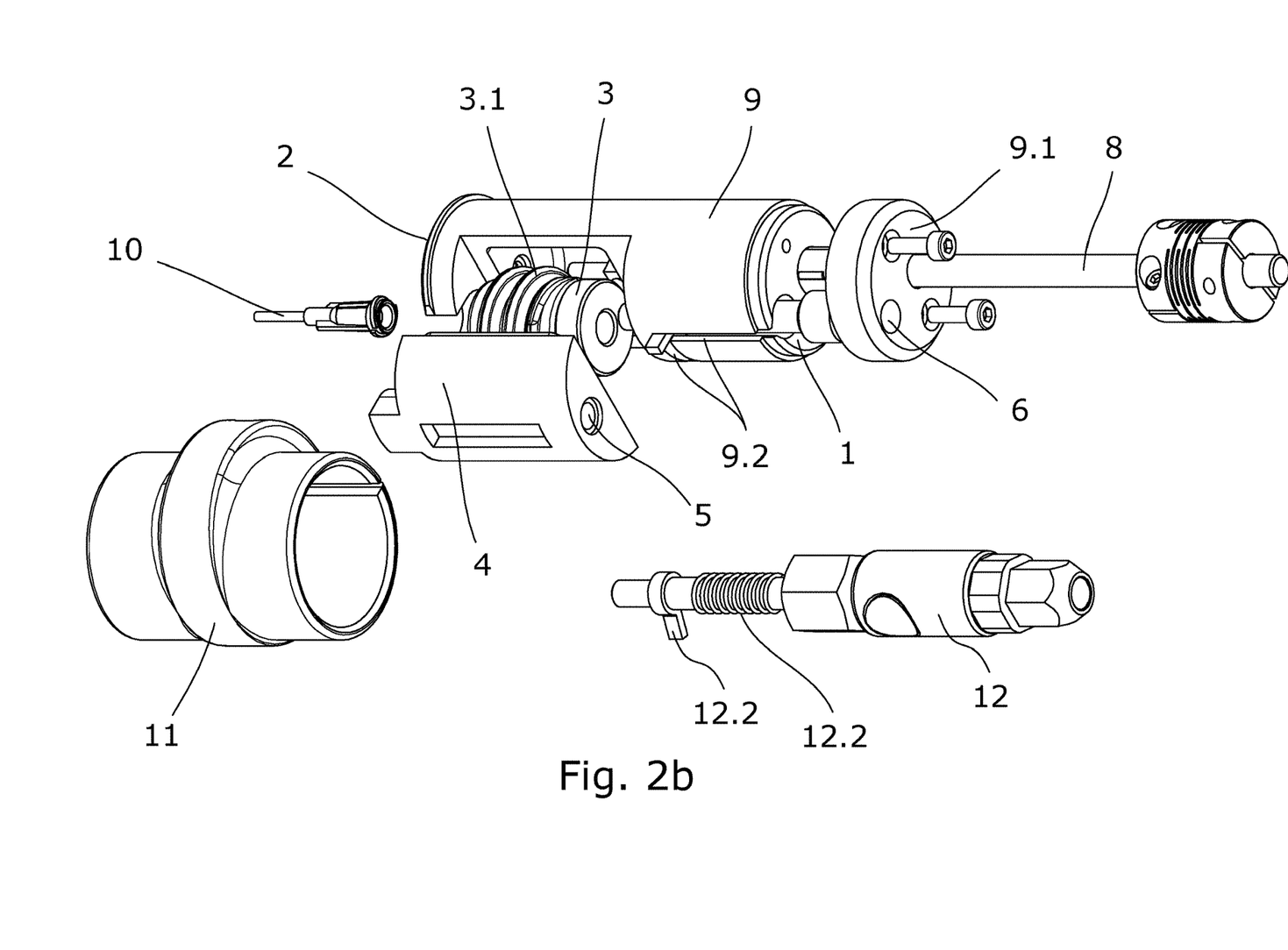

In a second embodiment shown in FIGS. 2a and 2b, the tubular conduit (5) is part of the support backing (4), being partially or completely integrated in said element during manufacture or by means of assembly combining two or more parts. For example, the tubular conduit (5) and the support backing (4) can be made by joint injection using different materials or manufactured with the same material.

In this embodiment, the support backing (4) is configured as a cover closing a cavity housing mainly the spindle (3). Along the perimeter of the opening established by the cavity, the support backing (4) comprises a sealing gasket (14) manufactured with an elastically deformable material, for example, rubber, which allows closing in a leak-tight manner the cavity of the spindle (3), both to prevent the lubricant from leaking out through the joint, and to prevent dirt, dust or foreign bodies from entering said cavity.

FIG. 2b shows an exploded view of the assembly in which the spindle (3), the support backing (4), the tubular conduit (5) and other elements are not in their normal operating position to allow better viewing the assembly. It can be seen in this FIG. 2b that in this embodiment the support backing (4) has a prism shape, with a section having a circular sector, and a gap configured to allow partially housing the spindle (3), allowing its rotation and the contact between the tubular conduit (5) and the threads (3.1) of the spindle (3), the tubular conduit (5) being arranged parallel to the longitudinal axis of the prism. Furthermore, the support backing (4) is configured for fitting in a gap of the shell (9) housing it. This gap is particularly adapted to make it easier to take out the support backing (4) with the tubular conduit (5) for quick replacement. In this case, the bases (1, 2) of the device are integral parts the shell (9) and perform a structural function, joining the rest of the elements and serving as a mount and protection for said elements; considering its function as a mount for the spindle (3), the bases (1, 2) comprise a set of needle or roller bearings (13.1, 13.2), on which the ends of the shaft of the spindle (3) are supported. It is advantageous in this case to introduce a rear cover (9.1) protecting the paste inlet (6) and the access of the shaft (8), in addition to allow holding a feed connector (12).

The assembly of the support backing (4) with the tubular conduit (5) is fixed to the device by means of a closure element, for example a clamp (11) secured by means of a threaded bolt or the like that envelopes part of the shell (9) and the support backing (4), such that the device can work safely without the support backing (4) moving from its operating position.

Figure 2C:
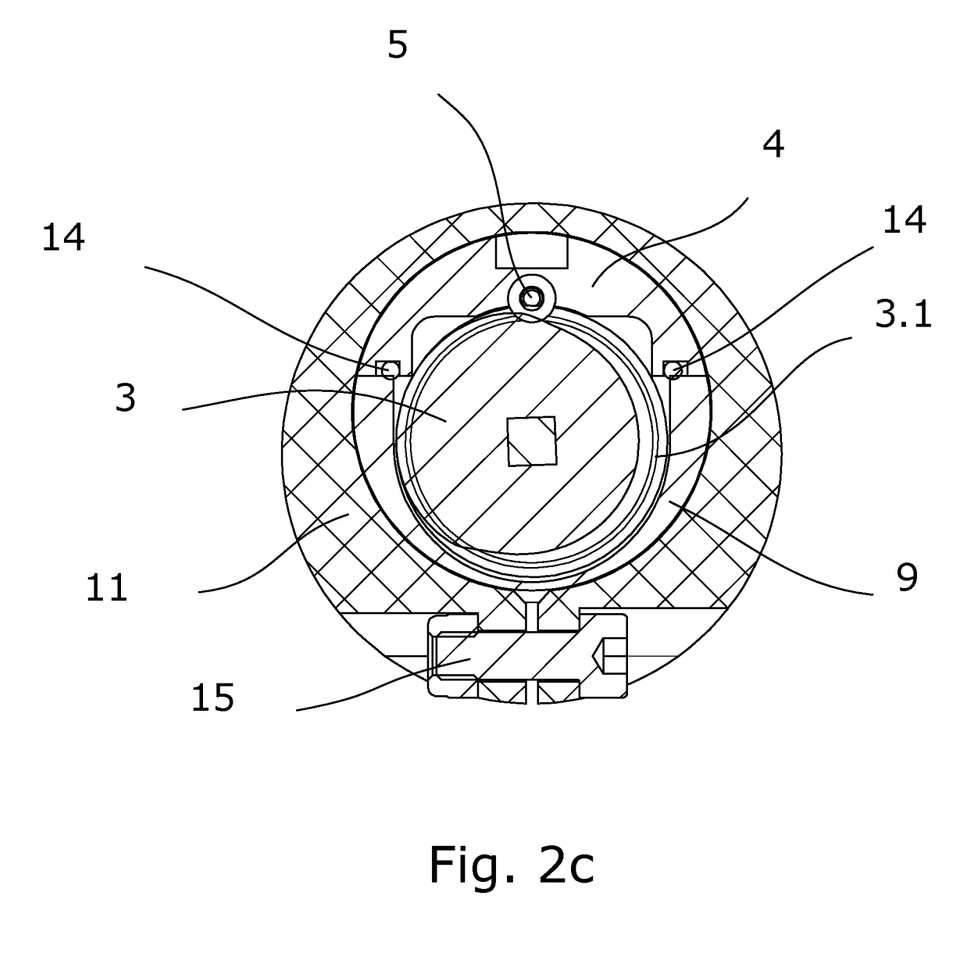

FIG. 2c shows a cross-section view in which the arrangement of the spindle (3) with respect to the tubular conduit (5) and the support backing (4) can be seen more clearly. The position of the support backing (4) is such that it almost completely surrounds the tubular conduit (5), only exposing the portion pressed by the threads (3.1), but without hindering the movement of the spindle (3). The shell (9), in contact with the sealing gasket (14) of the support backing (4) closes the cavity of the spindle (3) in a leak-tight manner, and the assembly is attached in the operating position by means of the clamp (11) which is closed with a locking bolt (15).

According to another embodiment, the system comprises in addition to the dosing device, a drive motor applying drive torque to the spindle (3). This motor can be an electric motor, a pneumatic motor or another type of motor, but it is desirable for the power, speed and direction of rotation of said motor to be controllable by the operator. The drive motor according to one embodiment is connected to the device through a flexible shaft (8) which allows transmission of torque from any position and orientation, or by means of a rigid shaft (8) indicated for static applications or in which the device is mounted on an articulated mount, such as on a robotic arm, for example. Alternatively, according to another embodiment power is transmitted by means of a pressurized fluid, in which case the device would comprise a turbine for obtaining the drive torque of the pressurized fluid.

The paste is supplied to the device through the feed connector (12) which, depending on the particular application, is carried out by means of a vessel or by means of a continuous pumping apparatus. In the first case, a pressurized vessel loaded with paste which must be replenished once it runs out is used. If a pumping apparatus is used, it is desirable for the feed connector (12) to be resistant to abrasion and high pressures; the apparatus will possibly have a system for maintaining the pressure of the fluid above the atmospheric pressure for the purpose of making it easier to feed the paste, although any of the possible paste feeding modes can be carried out at atmospheric pressure, resorting exclusively to the suction produced by the spindle (3)-tubular conduit (5) assembly for moving the paste.

In one embodiment, the feed connector (12) comprises a retention spring (12.1) and a fixing rod (12.2), having the function of securing the connection between the tubular conduit (5) and the pressurized paste supply conduit. To that end, the feed connector (12) is introduced through the inlet (6) of the device, while the fixing rod (12.2) slides at the same time along a fixing groove (9.2) made in the axial direction on the side of the shell (9). Said fixing groove (9.2) has a final portion forming a right angle, such that when the fixing rod (12.2) reaches said final portion, it is possible to cause the rotation of the feed connector (12), such that the fixing rod (12.2) slides along the final portion of the fixing groove (9.2) and is locked in said position. The retention spring (12.1) in turn assures the fit between the tubular conduit (5) and the feed connector (12) allowing the paste to flow without leaking.

The system furthermore allows a quick disassembly method which can be performed in four phases using only one tool. Said process comprises the phases of:
  a) taking out the locking bolt (15) with a screwdriver or a comparable tool;
  b) removing the clamp (11);
  c) removing the feed connector (12) by means of rotating the fixing rod (12.2) and moving it in the longitudinal direction;
  d) taking out the support backing (4).

Once the support backing (4) has been taken out, it can be replaced entirely if necessary, cleaning tasks can be performed, the tubular conduit (5) can be replaced, the sealing gasket (14) can be replaced, the lubricant can be replenished, the spindle (3) can be replaced, etc. The disassembling operation requires the application of the disassembling steps carried out in reverse order.

Figure 3A:
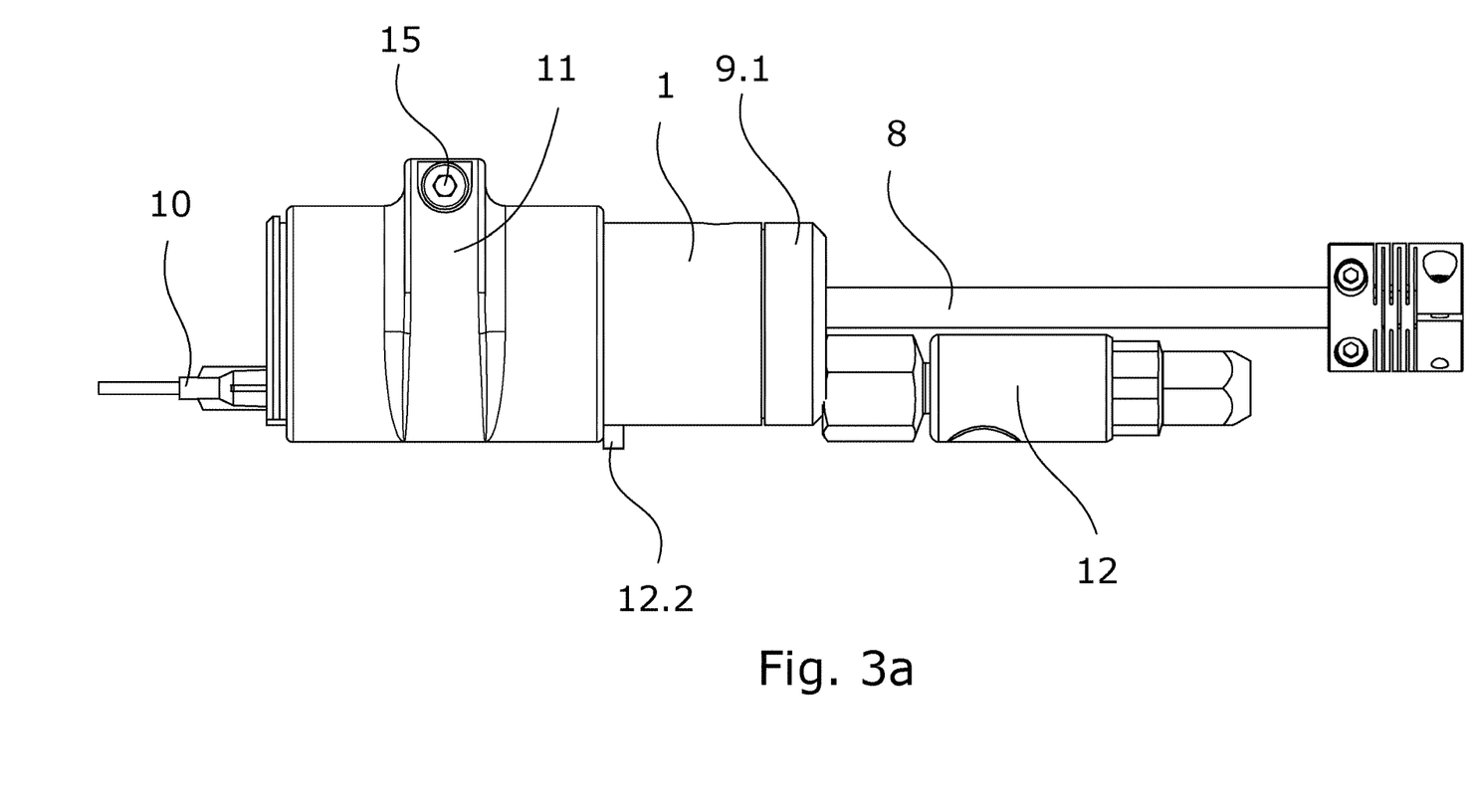
FIGS. 3a-3b show two views of the device in an operating position.
Figure 3B:
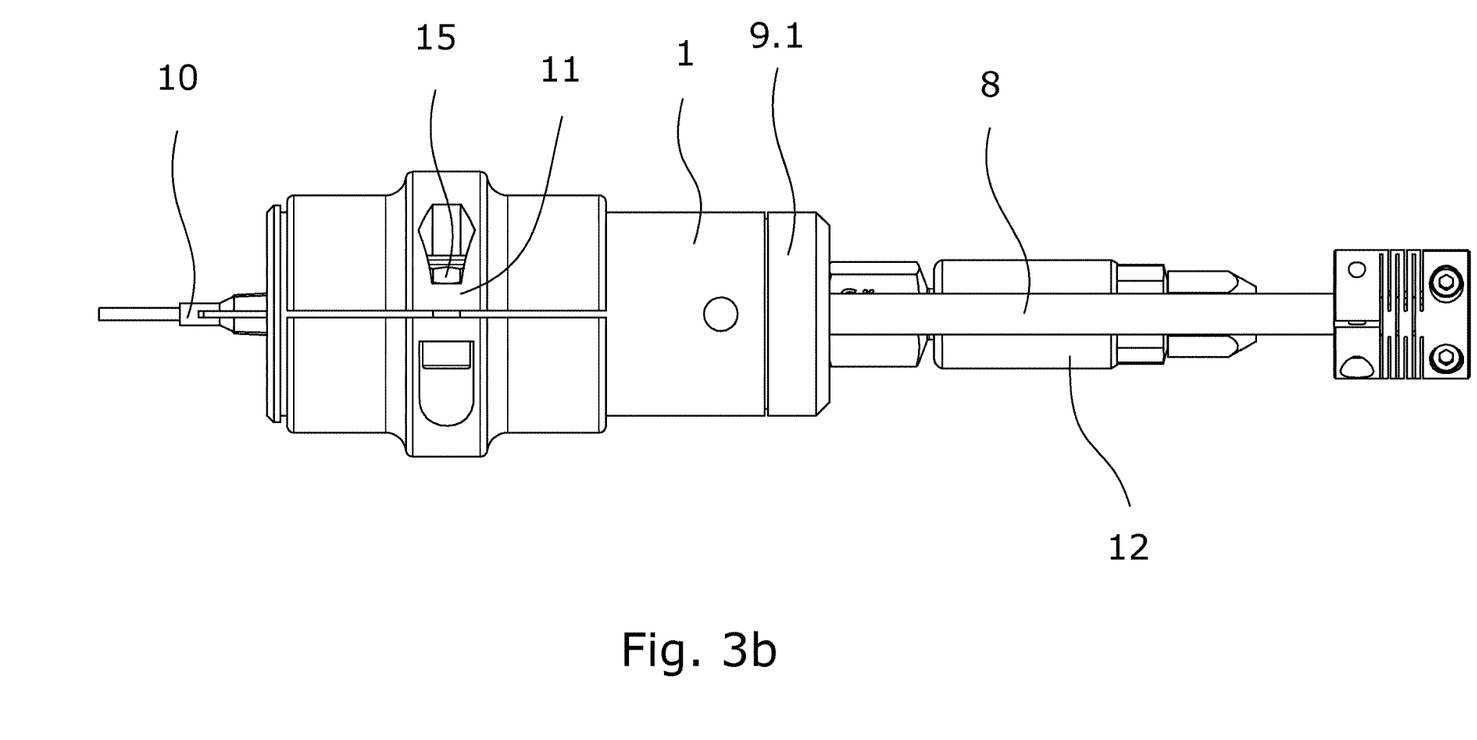

FIG. 3a shows the profile of a device assembled and in an operating position. This figure shows the clamp (11) and the fixing rod (12.2) inserted in the fixing groove (9.2). The mechanical drive of the device, the shaft (8), and the connection point of the pressurized conduit, the feed connector (12), can be seen. FIG. 3b shows the device also in the operating position from a point of view rotated 90 degrees with respect to FIG. 3a, which allows seeing the essentially cylindrical shape of this embodiment. This shape is particularly advantageous so that an operator can hold the device comfortably with only one hand and use it, for example, in an assembly line from several positions. Additionally, the device can adapt a "pistol"-type handle so that it can be handled without having to bend the wrist.

The invention claimed is:
1. A device adapted to dosing fluids having a pasty consistency, comprising:
  a first base with an inlet for the fluid;
  a second base, spaced from the first base, with an outlet for the fluid;
  an elastically deformable tubular conduit with an end in fluid communication with the inlet and with the opposite end in fluid communication with the outlet;
  a rotating spindle with at least one spiral thread for driving the fluid housed in the tubular conduit, with an end of the spindle rotationally attached to the first base and the opposite end of the spindle rotationally attached to the second base, this spindle being adapted for pressing on the tubular conduit with at least one part of its spiral thread;

a support backing of the tubular conduit such that at least the segment of tubular conduit adapted for being in contact with the spindle is located between the spindle and the support backing, wherein the tubular conduit and the support backing are integrated in a same part, wherein the support backing is made of an elastically deformable material; and an actuating shaft integrally attached to the spindle for driving the rotation of said spindle wherein the part integrating the elastically deformable tubular conduit and the support backing are made from a joint injection of different materials or same materials, the support backing comprises a partial housing for the tubular conduit to allow the support of the tubular conduit on said support backing and to allow the contact of the spiral thread with the tubular conduit.

2. The device according to claim 1, wherein the tubular conduit and the support backing are independent parts.

3. The device according to claim 1, comprising a shell attached to the first base and to the second base.

4. The device according to claim 3, wherein the shell comprises one or more screws transversely threaded to said shell, with the head accessible from the outside, the end of which reaches the support backing to act as a temporary support with respect to the adjustable spindle.

5. The device according to claim 1, wherein the first base, the second base, or both, are integral part of a shell.

6. The device according to claim 1, wherein the shaft is flexible, connecting an actuator motor and the spindle to allow for the manual orientation of said device.

7. The device according to claim 1, wherein the shaft is rigid, connecting an actuator motor and the spindle to allow for the mounting of said device on a machine.

8. The device according to claim 1, wherein the spindle has a discontinuous spiral thread for driving the fluid discontinuously.

9. The device according to claim 1, wherein the spindle has a spiral thread with a curved section.

10. The device according to claim 1, comprising a mechanical, electromagnetic or pneumatic clamp for maintaining the support backing.

11. A system for dosing fluids having a pasty consistency comprising a device according to claim 1, the system further comprising:

a drive motor for driving the shaft which can be regulated by the user;

a fluid drive unit for increasing the pressure of said fluid at the inlet; or both the drive motor and the fluid drive unit.

* * * * *